United States Patent
Keller, Jr.

(10) Patent No.: US 7,895,372 B2
(45) Date of Patent: Feb. 22, 2011

(54) UNIVERSAL SERIAL BUS MASS STORAGE DEVICE ASYNCHRONOUS FILE AND FILE SYSTEM UPDATE WHILE CONNECTED TO A PC OR OTHER DEVICE

(75) Inventor: Theodore R. Keller, Jr., Calhan, CO (US)

(73) Assignee: Fluke Corporation, Everett, WA (US)

( * ) Notice: Subject to any disclaimer, the term of this patent is extended or adjusted under 35 U.S.C. 154(b) by 242 days.

(21) Appl. No.: 12/053,499

(22) Filed: Mar. 21, 2008

(65) Prior Publication Data

US 2009/0240846 A1    Sep. 24, 2009

Related U.S. Application Data

(60) Provisional application No. 61/038,359, filed on Mar. 20, 2008.

(51) Int. Cl.
*G06F 3/00* (2006.01)
*G06F 11/00* (2006.01)

(52) U.S. Cl. .................. 710/19; 710/15; 714/1

(58) Field of Classification Search .............. None
See application file for complete search history.

(56) References Cited

U.S. PATENT DOCUMENTS

| | | | |
|---|---|---|---|
| 6,044,477 A * | 3/2000 | Jordan et al. | 714/39 |
| 6,145,098 A * | 11/2000 | Nouri et al. | 714/31 |
| 6,279,153 B1 * | 8/2001 | Bi et al. | 717/171 |
| 6,697,963 B1 * | 2/2004 | Nouri et al. | 714/31 |
| 7,409,476 B1 * | 8/2008 | Liang et al. | 710/52 |
| 7,523,149 B1 * | 4/2009 | Sridharan et al. | 1/1 |
| 7,707,249 B2 * | 4/2010 | Spataro et al. | 709/205 |
| 2004/0088456 A1 * | 5/2004 | Zhang | 710/74 |
| 2005/0149525 A1 * | 7/2005 | Verma et al. | 707/8 |
| 2008/0250086 A1 * | 10/2008 | Kisley | 707/204 |
| 2009/0079823 A1 * | 3/2009 | Bellamy et al. | 348/143 |

* cited by examiner

*Primary Examiner*—Henry W Tsai
*Assistant Examiner*—Michael Sun
(74) *Attorney, Agent, or Firm*—patenttm.us

(57) ABSTRACT

A system and method for universal serial bus mass storage device asynchronous file and file system update while connected to a PC or other device employs setting error flags and timestamp change flags when a file is changed, and returning the error conditions in reply to a REQUEST_SENSE command.

20 Claims, 1 Drawing Sheet

UNIVERSAL SERIAL BUS MASS STORAGE DEVICE ASYNCHRONOUS FILE AND FILE SYSTEM UPDATE WHILE CONNECTED TO A PC OR OTHER DEVICE

CROSS-REFERENCE TO RELATED APPLICATIONS

This application claims priority from U.S. provisional patent application Ser. No. 61038359 filed Mar. 20, 2008.

BACKGROUND OF THE INVENTION

This invention relates to mass storage devices, and more particularly to a system, apparatus and method for asynchronous file and file system update on a universal serial bus (USB) mass storage device (MSD) while connected to a PC.

When a Universal Serial Bus (USB) Mass Storage Device (MSD) is connected to a host computer (PC), the device goes through a process called enumeration, the method used to inform the PC of the device's identification (Virtual LAN ID (VID), process identification number, PID)), function (i.e., human interface device (HID), mass storage device (MSD), etc.), capabilities (e.g. MSD size, name, etc.) and the like. An MSD device also informs the PC which interface to use when "talking" to the device. In the case of most MSD devices (such as those that work with Microsoft Windows operating systems), the Small Computer Systems Interface (SCSI) is used. The transport interface is defined as Bulk Only Transport (BOT), with transport of command, data, and status occurring solely via bulk endpoints and not via interrupt or control endpoints. These features are important because they are supported by the Microsoft Windows USB MSD driver.

The USB protocol encapsulates the SCSI commands sent to a USB device. The device decodes the SCSI commands and responds with a SCSI response encapsulated in a USB protocol. The USB protocol uses the Command Block Wrapper (CBW) for host to device communication and the Command Status Wrapper (CSW) for responses from the device to the host.

The traditional and usual mode of operation of a USB device is for the device to relinquish control of its file system to the host PC while connected via a USB port. This limitation does not allow the device to update the file system while connected to the PC, that is, there is no ability to asynchronously update the file system.

SUMMARY OF THE INVENTION

In accordance with the invention, a method and system is provided wherein when a file or file system is changed on a SCSI device (via the SCSI command and response protocol) while connected to a PC or the like, error condition and time stamp update flags are set and are then returned in reply to a request for device status.

Accordingly, it is an object of the present invention to provide a method and apparatus to enable asynchronous updating of files and file system on a USB mass storage device while connected to a PC or other device.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a system and method for enabling asynchronous file and file system updates of a USB mass storage device while connected to a PC.

Figure 1:
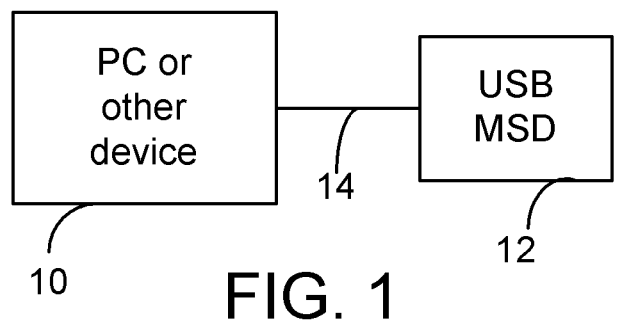
FIG. 1 is a block diagram of a PC with a USB MSD connected thereto.

FIG. 1 is a block diagram of a PC 10 with a USB mass storage device (USB MSD) 12 connected thereto via USB interface 14. PC 10 can comprise a computer capable of running as a USB Host, or any system capable of being a USB Host. USB MSD 12 can comprise a camera, a phone, memory, solid state memory, hard drive or other device adapted to act as a USB MSD.

While the USB MSD 12 is connected to the PC, if it is desired to asynchronously update the file system, in accordance with the system and method, by using capabilities in the SCSI command set, the prior art limitation of not being able to asynchronously update the file system can be eliminated.

The file system contains information about the files stored on the device. The information is stored in several tables, the tables being stored in partitions on the device.

The tables are:
the Master Boot Record (MBR),
the Partition Root Directory, and
the FAT(s) (file allocation table).

The MBR contains information about where the Partition Root Directory is on the device. The Partition Root Directory contains information on each file stored on the device (i.e. name, extended name, attributes, dates, size, starting Logical Block Address (LBA), etc.). The FAT contains information that indicates which sectors a file occupies.

This information gives the PC the information needed to manipulate the file system and files on the device.

The SCSI protocol allows the PC to access sectors on the device that contain the information for each of the tables and the files on the device.

The information and files are accessed using the LBA for each table or file. The SCSI protocol also includes commands to check the status of a connected device. The commands most typically employed to check the status of a connected device include, but are not limited to, TEST_UNIT_READY and REQUEST_SENSE.

The TEST_UNIT_READY command is a status request that checks to see if the USB MSD is ready to receive commands. The REQUEST_SENSE command is used to gather information about the internal state of the USB MSD. These commands are sent to the USB MSD during idle times, that is, when there no other commands being processed.

In accordance with the system and method, the SCSI command sequence used to overcome the file system limitations is to reply to the REQUEST_SENSE command with an error status with specific details indicating the file system has changed. This condition causes the PC to flush its file system cache and reread the file system from the device. Accordingly, a method and mechanism is provided for asynchronously updating the file system.

Figure 2:
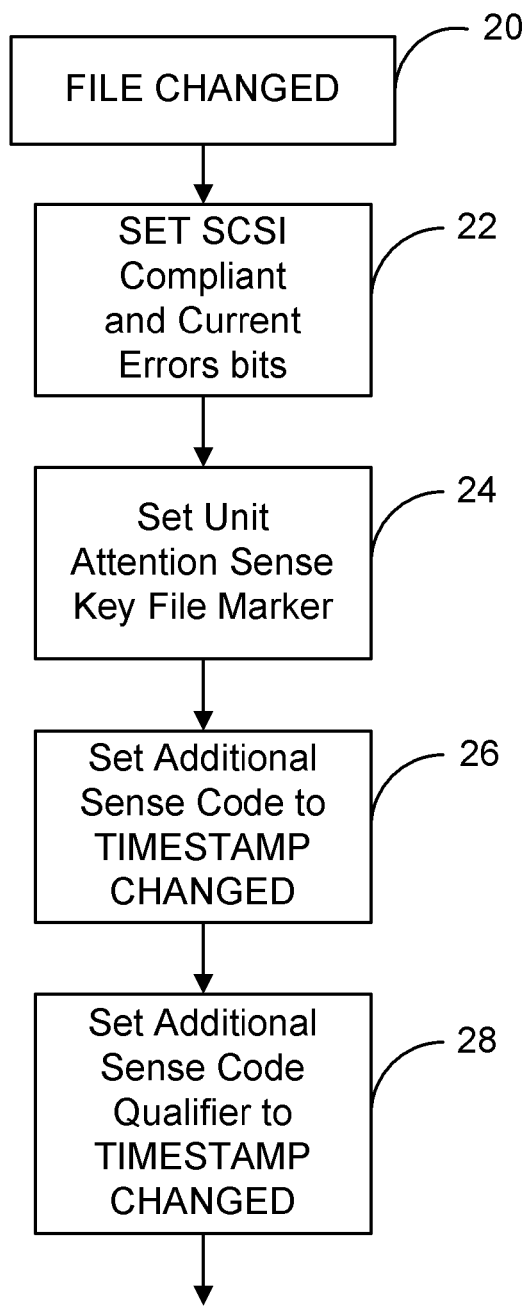
FIG. 2 is a flow chart showing setting for file changed condition.

Thus, referring to FIG. 2, if a file is changed on the USB MSD (block 20), the specific reply to the REQUEST_SENSE command is a status reply with the SCSI Compliant (value 0x80) and Current Errors (value 0x70) bits set (block 22), UNIT_ATTENTION sense key with the File Marker set (block 24), Additional Sense Code set to TIMES- TAMP_CHANGED (block 26), and the Additional Sense Code Qualifier set to TIMESTAMP_CHANGED (block 28).

Exemplary code sections for a particular embodiment are now illustrated.

Setting the condition when a file changes:

```
void MSD_SCSI_FileChange( )
{
    scsiSense.SenseKey                = UNIT_ATTENTION;
    scsiSense.LogicalBlockAddress     = 0x00;
    scsiSense.CommandInformation[0    = 0x00;
    scsiSense.CommandInformation[1]   = 0x00;
    scsiSense.CommandInformation[2]   = 0x00;
    scsiSense.CommandInformation[3]   = 0x00;
    scsiSense.AdditionalSenseCode = ASC_TIMESTAMP_CHANGED;
    scsiSense.AdditionalSenseCodeQualifier =
    ASCQ_TIMESTAMP_CHANGED;
}
```

Values used above are, for example:

```
          UNIT_ATTENTION          = 0x06
          ASC_TIMESTAMP_CHANGED   = 0x2A
          ASCQ_TIMESTAMP_CHANGED  = 0x10
```

A function setting the return status buffer when the REQUEST_SENSE command is received is as follows:

```
T_UINT32 MSD_SCSI_RequestSense(char *cmd)
{
    int       i;
    T_UINT8   size;
    T_UINT8   *ptr;
    // cmd points to the first part of the scsi command block
    // return sense data
    size = 18;
    // most of this is coded with regard to an MSD device
    g_buf[0]  = 0xF0;
           // sense data SCSI compliant 0x80 ; current errors 0x70
    g_buf[1]  = 0x00;                      // segment number
    g_buf[2]  = 0x80 | scsiSense.SenseKey; // file mark and
                                           sense key
    ptr       = (T_UINT8 *)&scsiSense.LogicalBlockAddress;
    g_buf[3]  = *ptr++;
    g_buf[4]  = *ptr++;
    g_buf[5]  = *ptr++;
    g_buf[6]  = *ptr++;
    g_buf[7]  = size - 7;     // data buffer length - 7
    g_buf[8]  = scsiSense.CommandInformation[0];
    g_buf[9]  = scsiSense.CommandInformation[1];
    g_buf[10] = scsiSense.CommandInformation[2];
    g_buf[11] = scsiSense.CommandInformation[3];
    g_buf[12] = scsiSense.AdditionalSenseCode;
    g_buf[13] = scsiSense.AdditionalSenseCodeQualifier;
    g_buf[14] = 0x00;         // field replaceable unit code
    g_buf[15] = 0x00;         // Sense key specific (optional)
    g_buf[16] = 0x00;
    g_buf[17] = 0x00;
    // transmit the buffer
    SerialPutBuf((T_UINT8 far*)g_buf, size);
    // reset for next round
    MSD_SCSI_ClearSense( );
    return (T_UINT32)size;
}
```

Accordingly, in accordance with the above, a file and the file system on a USB MSD can be asynchronously updated while connected to a PC. By employing the method, the PC will flush its file system cache and reread the file system from the device, which means that a file may be updated or changed and the PC will recognize that the change has taken place.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A system for providing universal serial bus mass storage device asynchronous file and file system update while connected to a PC, comprising:
    a status change detector that:
        sets a unit attention sense key file marker;
        sets an additional sense code to indicate a time stamped changed;
        sets an additional sense code qualifier to indicate time stamped changed; and
    a status return module that sets a return status buffer when a device status command is received from the PC, to return the flags and markers set by the status change detector.

2. The system according to claim 1, wherein said PC comprises a SCSI system.

3. The system according to claim 1, wherein said mass storage device comprises a memory.

4. The system according to claim 1, wherein said mass storage device comprises a solid state memory.

5. The system according to claim 1, wherein said mass storage device comprises a hard disk drive.

6. The system according to claim 1, wherein said mass storage device comprises a phone.

7. The system according to claim 1, wherein said mass storage device comprises a camera.

8. The system according to claim 1, wherein said PC comprises a camera.

9. The system according to claim 1, wherein said PC comprises a phone.

10. The system according to claim 1, wherein said status command comprises a request sense command.

11. A method for providing universal serial bus mass storage device asynchronous file and file system update while connected to a PC, comprising the steps of:
    setting a unit attention sense key file marker;
    setting an additional sense code to indicate a time stamped changed;
    setting an additional sense code qualifier to indicate time stamped changed; and
    setting a return status buffer when a device status command is received from the PC.

12. The method according to claim 11, wherein said PC comprises a SCSI system.

13. The method according to claim 11, wherein said mass storage device comprises a memory.

14. The method according to claim 11, wherein said mass storage device comprises a solid state memory.

15. The method according to claim 11, wherein said mass storage device comprises a hard disk drive.

16. The method according to claim 11, wherein said mass storage device comprises a camera.

17. The method according to claim 11, wherein said mass storage device comprises a phone.

18. The method according to claim 11, wherein said PC comprises a camera.

19. The method according to claim 11, wherein said PC comprises a phone.

20. The method according to claim 11, wherein said status command comprises a request sense command.

* * * * *